(12) United States Patent
Yao et al.

(10) Patent No.: US 9,097,574 B2
(45) Date of Patent: Aug. 4, 2015

(54) METHOD FOR CALIBRATING LARGE FIXED ELECTRONIC SCALE

(75) Inventors: Jinhui Yao, Fuzhou (CN); Qin Lin, Fuzhou (CN); Jianhui Lin, Fuzhou (CN); Hui Chi, Fuzhou (CN)

(73) Assignee: FUJIAN METROLOGY INSTITUTE, Fuzhou, Fujian (CN)

( * ) Notice: Subject to any disclaimer, the term of this patent is extended or adjusted under 35 U.S.C. 154(b) by 359 days.

(21) Appl. No.: 13/704,667

(22) PCT Filed: May 30, 2011

(86) PCT No.: PCT/CN2011/074874
§ 371 (c)(1),
(2), (4) Date: Dec. 17, 2012

(87) PCT Pub. No.: WO2012/000363
PCT Pub. Date: Jan. 5, 2012

(65) Prior Publication Data
US 2013/0098136 A1    Apr. 25, 2013

(51) Int. Cl.
*G01G 19/02* (2006.01)
*G01G 23/01* (2006.01)
(52) U.S. Cl.
CPC ............... *G01G 23/01* (2013.01); *G01G 19/02* (2013.01)
(58) Field of Classification Search
CPC ...... G01G 23/01; G01G 23/012; G01G 19/02

USPC ...................... 73/1.13; 177/145, 146
See application file for complete search history.

(56) References Cited

U.S. PATENT DOCUMENTS 4,213,509 A * 7/1980 Hafner ........................ 177/199
4,658,921 A * 4/1987 Karpa ........................... 177/50
4,848,478 A * 7/1989 Hafner ........................... 177/50

OTHER PUBLICATIONS

English Machine Translation of Wang et al. (CN 2323364), Jun. 9, 1999, translated Feb. 3, 2015.*

* cited by examiner

*Primary Examiner* — Hezron E Williams
*Assistant Examiner* — David Z Huang (57) ABSTRACT

A method for calibrating large fixed electronic scale is provided. The method applies an auxiliary verification device to calibrate the large fixed electronic scale without using a weight and includes following steps of: loading and unloading every supporting point on the scale table board of the scale by at least one self-locating loading and unloading mechanism; measuring and displaying a load that each loading and unloading mechanisms applies to the scale table board by at least one high accuracy load gauge; controlling a size of the load that each loading and unloading mechanisms applies to the scale table board by a constant load control device; and comparing a precise load displayed by the high accuracy load gauge with a gauge weighing display value of the scale to obtain a calibration error of the scale. The present method greatly improves working efficiency and safety and reduces costs.

10 Claims, 9 Drawing Sheets

FIG. 12

METHOD FOR CALIBRATING LARGE FIXED ELECTRONIC SCALE

BACKGROUND OF THE INVENTION

1. Field of the Invention

The present invention relates to a verification of an electronic scale, more particularly a method for calibrating a large fixed electronic scale which belongs to a metrology verification technique.

2. Description of the Related Art

Fixed electronic scales are metrical weighing instruments with the most mature technique around the world and are in a mass production as well as a broad application. They are commonly applied in varies loading vehicles and goods measurement adapted to metallurgy, chemical industry, railway, port and industry and mining enterprises. They are also adapted to a trading settlement and a process control of the weighing process during the manufacture. Therefore, the fixed electronic scales are ideal metric or measurement instruments for modern enterprises to increase the weighing system. The principle of the fixed electronic scales is operated by setting the weighed objects or loading vehicles on a scale table. The scale table transmits the gravity to a swinging bearing such as a steel ball or a press head under the gravity force, and a spring member of the weighing cell becomes deformed, which makes a strain gauge bridge lose the balance and outputs an electric signal in a positive proportion to a weight value. The signal is then amplified via a linear amplifier, then converted into a digital signal via an A/D, and thence processed by a microprocessor of a gauge to display a weight number directly.

The fixed electronic scale needs to go about the verification before the use in order to check its accuracy class. Further, the large scale also has to verify again to check the accuracy level after the scale is used for a period of time or equipped with replaced elements so that the scale can be properly adjusted to meet the requirement of the accuracy. A standard instrument applied in calibrating conventional fixed electronic scales is mainly divided into three kinds. The national standard no.GB7723-2008 of the fixed electronic scale, adopting the international criteria of OIML R76 "non-automatic scale" (2006E), explicitly points out three permissible standard equipments, namely (1) a weight, more specifically standard weights or standard quality; (2) an auxiliary verification device, more specifically a scale equipped with an auxiliary verification device or an independent auxiliary device; and (3) a substitute for standard weights in verification, more specifically part standard weights and other random fixed loads replacing standard weights.

However, in the regulation of verification of JIG539-1997 titled by "numeral indicator scale", the standard equipments as stipulated are divided into two types: (1) a standard weight; and (2) a standard weight and a substitute of the standard weight. Therefore, the common used standard equipments for calibrating and verifying fixed electronic scales are the standard weight or the standard weight as well as its substitute, and the auxiliary verification device is not adopted as the standard equipment to calibrate the fixed scale. The international criteria of R76 titled by "non-automatic scale" and the national standard adapted to the fixed electronic scale no. GB7723-2008 provides the auxiliary verification device with a simple stipulation that if the scale is equipped with any auxiliary verification device or an independent auxiliary device is used for the verification, the maximum permissible error of the device should be one-third of the maximum permissible error of the verified load. There is no exact definition for the auxiliary verification device cited in the aforementioned international criteria and GB7723-2008 standard except for the above stipulation stating a maximum permissible error of the auxiliary verification device. Until now, it is still rarely to find out documentations related to the application of auxiliary verification device in calibrating large fixed electronic scales around the world.

A disclosure as published by China patent no. CN86105843 on 1988, Feb. 17 and titled by "a verification device for truck scale and track scale". This disclosure mainly discloses a verification device without using a weight, but the accuracy of the quasi-pressure gauge as disclosed fails to comply with the accuracy requirement as stipulated. Another disclosure as published by China utility innovation no. CN02230837.7 on 2003, Jan. 22 and titled by "large scale gauge". This disclosure also discloses a scale verification gauge without using a weight. More specifically, this disclosure includes a verification cell (4), a display gauge (7), a pressure device, and a pressurizing support (3). The pressurizing support is integral with a base of a verified scale. The pressure device is fixed onto the pressurizing support. The metric accuracy of the verification cell and the display gauge is larger than the metric accuracy of the verified scale. The verification cell is disposed on a scale body (9) of the verified scale. The verification cell and the pressure device are connected by a sphere and an output of the verification cell is connected to the display gauge. The pressure of the pressure device is applied to the cell and displayed by the display gauge. The pressure is concurrently applied to scale body of the verified scale and displayed by a scale gauge. The two displayed value are thence compared to detect the calibration error of the verified scale. However, the verification device as disclosed can only detect the in-service cells applied in the scale one by one. The verification device is effectively a superposition force standard machine. The pressure device and the pressurizing support load manually, which cannot satisfy the requirement of a load fluctuation (force source stability) and a force stability retentive time stipulated in "JJG734-2001 regulation of verification of force standard machines" and "JJG144-2007 regulation of verification of standard gauges". The verification span focuses on verifying the loading value of every in-service cell of the scale, not on verifying the span of the scale. The verification accuracy of the scale is related to the accuracy of every cell and is also related to a rigidity of the scale table, a foundation of the scale table, an accuracy of the gauge, and a junction box. Although the in-service cell of the scale is eligible, the metric property of the scale may not be eligible. Therefore, it is not satisfied by only working on the full verification of the metric property of the scale. The factors affecting the scale accuracy such as the deflection of the scale table, the foundation of the scale table, the accuracy of the gauge, and the junction box should be additionally considered during the verification. The disclosure can only detect the cell, so the verification process cannot explain by analogy with the effective weighing state and can only go about the analogous comparison of similarity between the in-service cells of the scale. The most important issue is that the disclosure cannot verify the scale directly.

Figure 1:
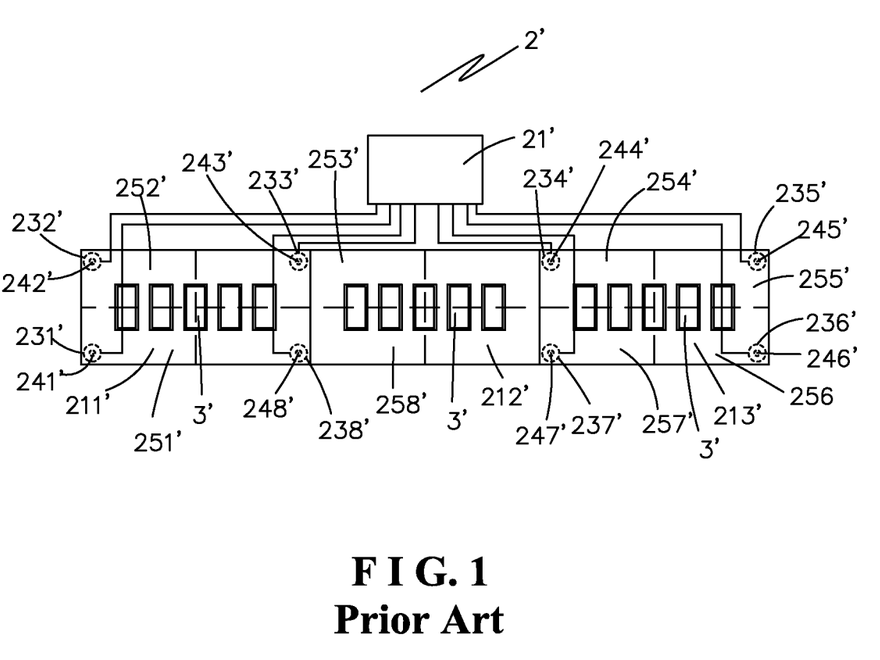
FIG. 1 is a schematic view showing a conventional method which applies the standard weight or the standard weight and the substitute to calibrate the scale.

The current method for calibrating a fixed electronic scale is described. First, take a verification of a fixed electronic truck scale weighed 100 tons as an example and apply the standard weight and the substitute of the standard weight to proceed the verification according to the fixed electronic scale national standard no. GB7723-2008 or to the requirement of regulation of verification stipulated by JJG539-1997, "digital indicator scale". Wherein, referring to FIG. 1, it is noted that a fixed electronic truck scale 2' in a specification of 100 tons and with conditions of three sections with 18 meters in length, e=50 kg, m=2000 is defined. The disclosure includes a scale display gauge 21', three scale table boards 211',212',213', eight cells 231'-238', eight cell support points 241'-248' disposed above respective cells, and eccentric load testing areas 251'-258' correspondingly disposed around respective cell support points as shown by dotted line in FIG. 1. While verifying, put the standard weight or the substitute of the standard weight 3' on each eccentric load testing area to execute an eccentric loading test sequentially. The specific process for the verification of the metric property includes steps of:

1. Pre-pressurizing: pre-applying the load to 100 t at once or using a loading vehicle not less than 50 t to go back and forth a loader not less than 3 times;
2. Accuracy of the zero setting and tare device;
3. Zero setting before loading;
4. Weighing the property:
4.1 Applying the standard weight and the substitute during the verification to check the quantity of the standard weight and execute the repeatability test of the scale. First, check the repeatability of the weighing point at 50 t and apply the standard weight weighing 50 t to the loader three times. If the error of the repeatability is not larger than 0.3 e, the standard weight 3' can be reduced to 35% of the maximum weighing measure. If the error of the repeatability is not larger than 0.2 e, the standard weight 3' can be reduced to 20% of the maximum weighing measure;
4.2 Weighing test: add the weight or the substitute 3' from a zero to 100 t in a sequence from the smallness to the bigness and remove the weight to return to the zero by the same way. At least five verification points, such as it, 25 t, 50 t, 75 t, and 100 t should be at least chosen for testing;
4.3 Tare weighing test: at least two different tare weights are detected by a tare weighing test. According to step 4.2, the five test points are it, 50 t, the changed scale measure of the maximum permissible error, the possible maximum net weight, and 80 t;
4.4 Eccentric loading test: put the standard weight 3' weighing 14 t on the eight eccentric load testing areas 251'-258' by turns for testing until errors of indicating values of the eight eccentric load testing areas 251'-258' are all not larger than 50 kg;
4.5 Discrimination test: execute the test at the weighing points 1 t, 50 t and 100 t while executing the verification; and
4.6 Repeatability test: prepare and test two respective groups at 50 t point and a point close to the maximum point (90 t). Each group is repeatedly tested at least three times.

From the above verification, it needs to transport a tonnage corresponding to the weight of the standard weight or the substitute. For example, (1) the weight of 100 t is carried in the pre-pressurizing step; (2) the weight of 150 t is carried in the 4.1 step for executing the repeatability test of the scale while adopting the standard weight and the substitute to check the quantity of the standard weight; (3) the weight of 100 t is carried in the 4.2 step for the weighing test; (4) the weight of 160 t is carried in the 4.3 step for the tare weighing test; (5) the weight of 112 t is carried in the 4.4 step for the eccentric loading test; and (6) the weight of 270 t is carried in the 4.6 step for the repeatability test.

Therefore, disadvantages attendant on the conventional method applying the standard weight or the standard weight and the substitute to calibrate the fixed electronic scale are described:

1. Heavy workload of the verification and low efficiency. To detect an eligible 100 t fixed electronic truck scale would require moving the standard weight and the substitute which are total 932 t in weight. If it is not eligible, an adjustment is needed. After the adjustment, the re-verification is executed and the weight is moved again. The process of moving the weight or the substitute weighing over thousand tons is inevitably required.

2. Poor safety of moving a large number of weights or substitutes. Due to the limited loading table of the electronic truck scale, such as 54 square meters in area for verifying a truck scale weighing 100 tons, it is difficult to put the weight or the substitute weighing 100 tons on the limited area and is also dangerous for loading and unloading the weight or the substitute.

3. Hard to seek the suitable substitute. Not all users of large electronic truck scales can find suitable substitutes. For example, the standard scale installed aside the highway is hard to find the proper substitute, and users at the railway, the port, containing liquid poison, gaseous chemical industry, textile factory, coal mine, etc. are also hard to find suitable substitutes.

4. Hard to transport the standard weight. To detect a 100 t truck scale would require transporting the standard weight weighing at least 50 t. To detect a 150 t truck scale would require transporting the standard weight weighing at least 75 t. In the practical operation nowadays, it can only transport the weight weighing 15 t at once. The limited amount of the transportation at once is especially carried out in the montane district including a bridge limit load, a road limit load, a geography limit load, an installation in the gully (such as at the mine), etc.

5. High costs. To transport and move such a large number of standard weights or substitutes would require many verification scale vehicles and hoists and spend days and labors fulfilling the verification. For example, to detect a 100 t truck scale generally requires 7 working days.

To sum up, most of county agencies, city agencies and provincial agencies are devoid of sufficient standard weights for calibrating the large scale such as the 150 t electronic truck scale. Even if the quantity of the standard weight is sufficient, the safety for loading, unloading and transporting the weight and the transporting cost can not be assured under the present technique. Further, although the weight is successfully transported to the target place, to go about the verification in light of the regulation of verification of JIG539-1997 "digital indicator scale" still requires a heavy workload and takes a large amount of time to detect, which renders the verification unable to be assured of meeting the regulation. Therefore, the conventional method for calibrating a large fixed electronic scale by applying the standard weights or the standard weight and the substitute still requires an improvement.

SUMMARY OF THE INVENTION

The object of the present invention is to provide a method for calibrating a large scale, which improves the problems such as the heavy workload, consumption of time and labors, complex process, and insufficient accuracy attendant on the conventional technique that applies the standard weight, the standard weight as well as the substitute, or other scale verification apparatus disposed without using a weight to calibrate the fixed electronic scale.

The present invention applies the following technique to solve the above problems. A method for calibrating a large fixed electronic scale is disclosed. The method is a verification method which applies an auxiliary verification device to calibrate the large fixed electronic scale without using a weight, wherein the verification method includes: step 1: loading and unloading every supporting point on a scale table board of the scale by at least four self-locating loading and unloading mechanisms; step 2: applying at least four high accuracy load gauges to measure and display a load that each of the loading and unloading mechanisms applies to the scale table board; step 3: applying a constant load control device to control a size of the load that each of the loading and unloading mechanisms applies to the scale table board and further control a size of a load of each supporting point on the scale table board so that the load of each supporting point corresponds to a required load applied to each of the supporting points while calibrating the scale; and step 4: comparing a precise load displayed by the high accuracy load gauges with a gauge weighing display value of the scale to obtain a calibration error of the scale.

Preferably, in the step 2, the high accuracy load gauges are respectively disposed above the loading and unloading mechanisms so that the high accuracy load gauges and the scale table board are concurrently subjected to a load with a same force and the load is displayed when the scale table board is loaded by the loading and unloading mechanisms. An accuracy of the high accuracy load gauges is at least three times larger than an accuracy of the scale required to be verified.

Preferably, the step 1 includes the following steps of:

s1: forming through orifices on the scale table board vicinity to supporting points of the scale respectively and correspondingly disposing a ground pulling collar or pulling rod into a scale table foundation below each of the through orifice in advance;

s2: installing a pulling framework at each of the through orifices to be perpendicular to the scale table board, and penetrating the pulling framework through the through orifice in step s1 for fixing the pulling framework with the ground pulling collar or pulling rod; and s3: arranging the loading and unloading mechanism around each pulling framework above the scale table board, which load and unload the scale table board by self-locating.

Preferably, the high accuracy load gauge includes at least three standard cells equidistantly disposed around the pulling framework so that the at least three standard cells are applied to detect a resultant value of the load which the loading and unloading mechanism applies to load the scale table board. Each standard cell is connected to a standard cell measure display device. The standard cell measure display device shows a size of the load. A detachable and adjustable limiting unit is disposed above each of the standard cells to assure that the high accuracy load gauges and the scale table board are concurrently subjected to a load with a same force when the scale table board is loaded by the loading and unloading mechanisms.

Preferably, in step s3, the loading and unloading mechanism applies a pressure bearing plate with an embedding of a universal bearing disposed between the scale table board and the loading and unloading mechanism to automatically regulate a pressure bearing orientation so that a bearing axis of the standard cell is parallel to a bearing axis of the pulling framework.

Preferably, in step s3, the loading and unloading mechanism is adopted by an oil cylinder system. The oil cylinder system includes an oil cylinder portion and a piston portion. The piston portion operates by moving upward to render the standard cell subjected to a force, and the oil cylinder portion operates by moving downward to render the scale table board subjected to a force.

Preferably, a pushing joint bearing is disposed on a top of the pulling framework to assure that a bearing axis of the standard cell corresponds to an axis of the standard cell. The pulling framework disposes a rod end joint bearing at a place below the scale table board to automatically adjust a coaxial degree of the pulling framework and the standard cell, render both axes of the pulling framework and the standard cell parallel with each other, and adjust the pulling framework and the standard cell to be perpendicular to the scale table board required to be verified. The pulling framework further applies a height regulating unit to adjust a demanded height of the pulling framework.

Preferably, the high accuracy load gauge applies a force standard machine to be calibrated by fixed point, and an indicating value thereof is a true value.

Preferably, the through orifice is a circular orifice with a diameter of $\phi 60$ mm or a quadrangular orifice with a specification of 50 mm×50 mm.

The method for calibrating a large fixed electronic scale in conformity with the present invention applies the second standard equipment as stipulated in the national standard regulation to verify the large scale and has advantages as follows:

1. The present invention does not belong to the cells for verifying the scale. It is applied to execute the requisite verification for the scale directly, so there is no need to detect the deflection of the scale table board. The present invention carries out the verification in the vicinity of the supporting points of the scale table directly and needs not to restrict the location of the cell support points, which allows simulating the effective weighing state of the scale.
2. Easy to verify and transport. Without using a weight, the present invention applies a verification device weighing less than 1.5 tons to provide a small bulk and a light weight, facilitating a safe and convenience verification and transportation.
3. Small workload. The present invention applies a constant load control device to load and unload automatically and executes an automatic control via a software design. Therefore, the present invention does not need to move the weight or the substitute weighing hundreds or thousands of tons and reduces the verification workload.
4. High efficiency. The present invention does not need to transport a large number of standard weights and seek the substitute. It only takes a half day to verify a truck scale that is 100 tons or 200 tons in weight, which attains a high working efficiency.
5. Low cost for the verification. Only a small freight car is needed to transport the standard equipment to the destination while carrying out the present method. It takes a half day to fulfill the verification.
6. Superior social benefits. Comparing with the conventional method using the standard weight as the standard equipment for calibrating the scale, the present invention estimates that an average transportation cost reduces about 5000 dollars and an average labor cost reduces about 3000 dollars per a verification of a large electronic truck scale. For example, if more than 4000 scales in China Fujian are verified twice per year, the cost can be reduced up to more than sixty million dollars for enterprises in China Fujian.

BRIEF DESCRIPTION OF THE DRAWINGS

The present invention over the known prior arts will be described in detail by reading following embodiments with relating drawings.

DETAILED DESCRIPTION OF THE PREFERRED EMBODIMENTS

The present invention discloses a method for calibrating a large fixed electronic scale. The method is a verification method which applies an auxiliary verification device to calibrate the large fixed electronic scale without using a weight. The verification method includes the following steps of:

Step 1: loading and unloading every supporting point on a scale table board of the scale by at least four self-locating loading and unloading mechanisms.

Step 2: applying at least four high accuracy load gauges to measure and display a load that each of the loading and unloading mechanisms applies to the scale table board. More specifically, the high accuracy load gauges are respectively disposed above the loading and unloading mechanisms so that the high accuracy load gauges and the scale table board are concurrently subjected to a load with a same force and the load is displayed when the scale table board is loaded by the loading and unloading mechanisms. An accuracy of the high accuracy load gauges is at least three times larger than an accuracy of the scale required to be verified.

Step 3: applying a constant load control device to control a size of the load that each of the loading and unloading mechanisms applies to the scale table board and further control a size of a load of each supporting point on the scale table board so that the load of each supporting point corresponds to a required load applied to each of the supporting points while calibrating the scale.

Step 4: comparing a precise load displayed by the high accuracy load gauges with a gauge weighing display value of the scale to obtain a calibration error of the scale.

In the above step 1 includes the following steps of:

S1: forming through orifices on the scale table board vicinity to supporting points of the scale respectively and correspondingly disposing a ground pulling collar or pulling rod into a scale table foundation below each of the through orifice in advance. The through orifice is a circular orifice with a diameter of φ60 mm or a quadrangular orifice with a specification of 50 mm×50 mm.

S2: installing a pulling framework at each of the through orifices to be perpendicular to the scale table board, and penetrating the pulling framework through the through orifice in step s1 for fixing the pulling framework with the ground pulling collar or pulling rod.

S3: arranging the loading and unloading mechanism around each pulling framework above the scale table board, which load and unload the scale table board by self-locating. The loading and unloading mechanism applies a pressure bearing plate with an embedding of a universal bearing disposed between the scale table board and the loading and unloading mechanism to automatically regulate a pressure bearing orientation so that a bearing axis of the standard cell is parallel to a bearing axis of the pulling framework.

More specifically, the high accuracy load gauge includes at least three standard cells equidistantly disposed around the pulling framework so that the at least three standard cells are applied to detect a resultant value of the load which the loading and unloading mechanism applies to load the scale table board. Each standard cell is connected to a standard cell measure display device. The standard cell measure display device shows a size of the load. A detachable and adjustable limiting unit is disposed above each of the standard cells to assure that the high accuracy load gauges and the scale table board are concurrently subjected to a load with a same force when the scale table board is loaded by the loading and unloading mechanisms. The high accuracy load gauge applies a force standard machine to be calibrated by fixed point, and an indicating value thereof is a true value.

The loading and unloading mechanism is adopted by an oil cylinder system. The oil cylinder system includes an oil cylinder portion and a piston portion. The piston portion operates by moving upward to render the standard cell subjected to a force, and the oil cylinder portion operates by moving downward to render the scale table board subjected to a force.

A pushing joint bearing is disposed on a top of the pulling framework to assure that a bearing axis of the standard cell corresponds to an axis of the standard cell. The pulling framework disposes a rod end joint bearing at a place below the scale table board to automatically adjust a coaxial degree of the pulling framework and the standard cell, render both axes of the pulling framework and the standard cell parallel with each other, and adjust the pulling framework and the standard cell to be perpendicular to the scale table board required to be verified. The pulling framework further applies a height regulating unit to adjust a demanded height of the pulling framework.

Referring to FIG. 2, FIG. 3, FIG. 4 and FIG. 10 show a specific preferred embodiment of a verification system to describe the method for calibrating a large fixed electronic scale of the present invention. A verification system 1 is a system with an independent auxiliary scale without using a weight and is adapted to measure and verify a large fixed electronic scale 2 (see FIG. 11). The system includes at least four pulling frameworks 11, at least four self-locating loading and unloading load measure devices 12, and a constant load control device 13. The pulling framework 11 and the loading and unloading load measure device 12 have the same quantity and disposed corresponding with each other. Each pulling framework 11 passes through a scale table orifice 211 on a scale table board 21 of the scale 2 for connecting with a scale foundation 3. The pulling framework 11 is perpendicular to the scale table board 21. Each of the loading and unloading load measure devices 12 is disposed around the pulling framework 11 to load and unload the scale table board 21 and execute the load measuring process in order to replace the application of the standard weight or the substitute of the standard weight. Each loading and unloading load measure device 12 includes a self-locating loading and unloading mechanism 121 and a high accuracy load gauge 122. The high accuracy load gauge 122 adjoins a top of the loading and unloading mechanism 121 to assure the accuracy and the traceability of the verification. An accuracy of the high accuracy load gauge 122 is at least three times larger than an accuracy of the scale. The constant load control device 13 and the loading and unloading mechanism 121 are connected so that the loading and unloading mechanism 121 maintains a constant load in time of loading.

Figure 3:
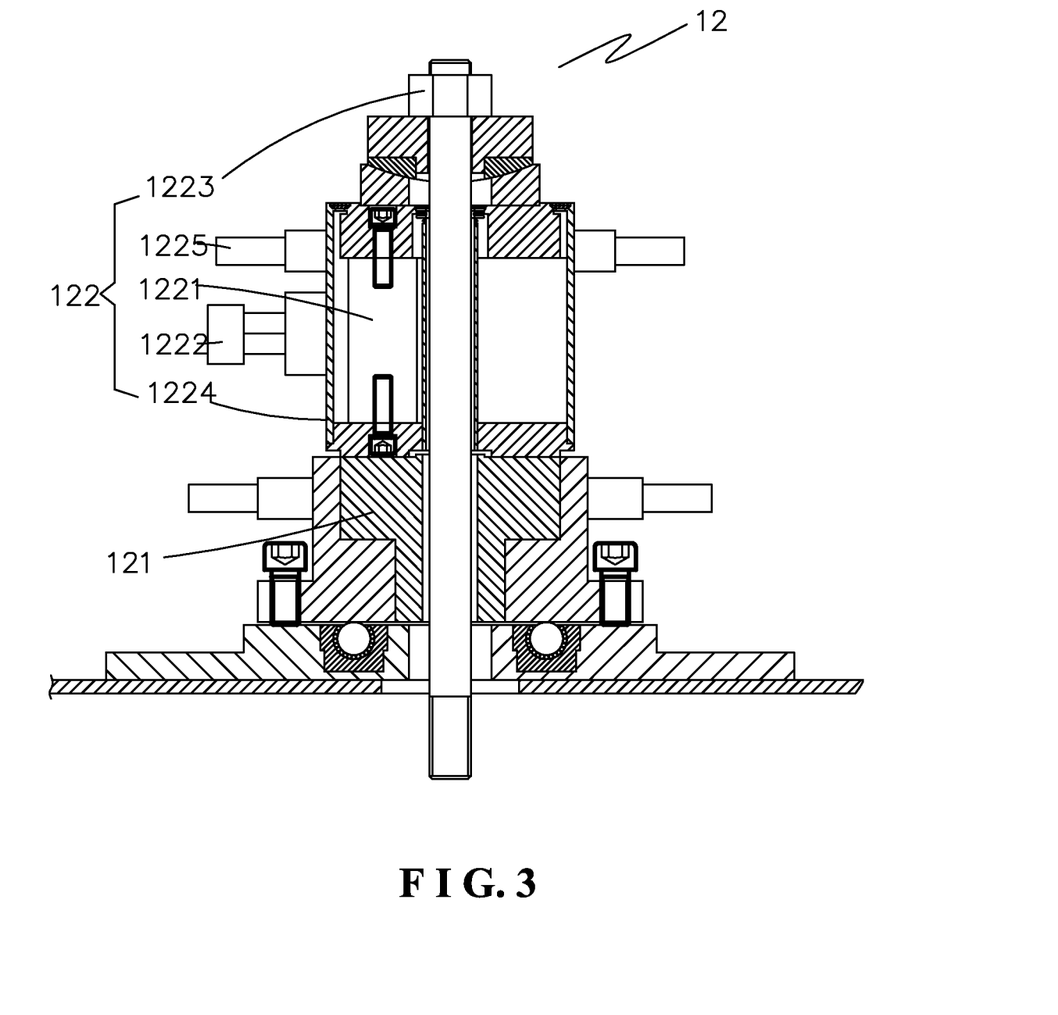
FIG. 3 is a cross-sectional view showing the self-locating loading and unloading load measure device of the present invention.

Referring to FIG. 3, the high accuracy load gauge 122 includes at least one standard cell 1221, a standard cell measure display gauge 1222 (see FIG. 10), and a limiting unit 1223. The limiting unit 1223 is disposed above the standard cell 1221 and is detachable for being adapted to restrict and adjust the location of the standard cell 1221. In this embodiment, the limiting unit 1223 is a nut screwing onto the pulling framework 11. The nut functions as a fastening and limiting means. The standard cell measure display gauge 1222 and the standard cell 1221 are connected so that a force load of the standard cell 1221 is displayed.

Figure 4:
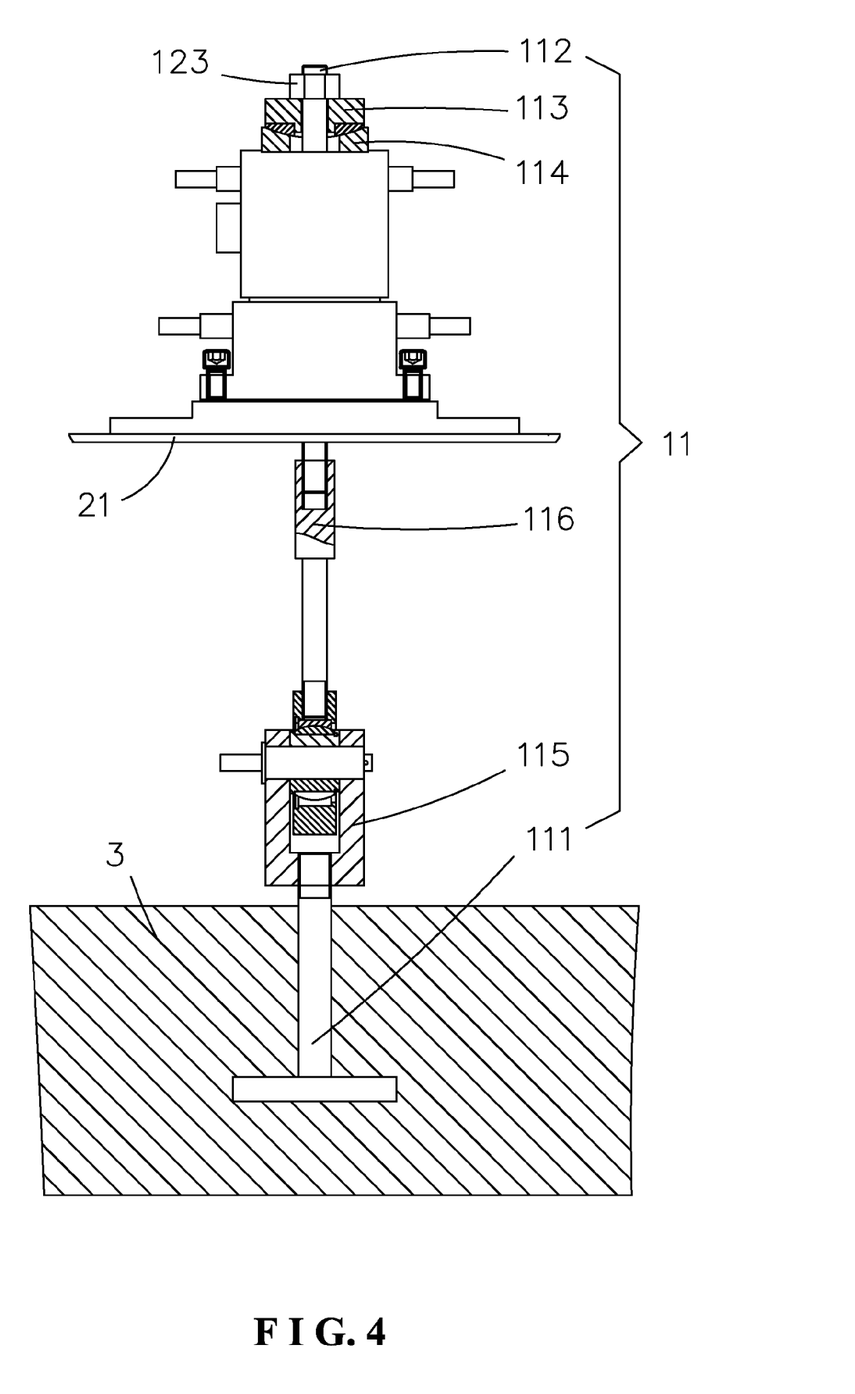
FIG. 4 is a cross-sectional view showing the verification system of the present invention.

Referring to FIG. 4, the pulling framework 11 includes a ground pulling rod 111, a pulling rod body 112, a pressure bearing unit 113, a pushing joint bearing 114, a self-adjustable coaxial mechanism 115, and a height regulating unit 116. FIG. 4 illustrates the ground pulling rod 111. The ground pulling rod 111 is buried in the profound depths of the scale foundation and fixedly connected to the pulling rod body 112. The pressure bearing unit 113 is disposed to adjoin a lower part of the limiting unit 1223 (e.g. the nut) and sleevedly attached to the pulling rod body 112. The pushing joint bearing 14 is disposed to adjoin a lower part of the pressure bearing unit 113 and sleevedly attached to the pulling rod body 112. The self-adjustable coaxial mechanism 115 is disposed between the pulling rod body 112 and the ground pulling rod 111 to automatically adjust the coaxial degree of the pulling rod body 112 and the standard cell 1221 (see FIG. 3) so that the pulling rod body 112 is retentively coaxial and perpendicular to the scale table board 21. More specifically, the self-adjustable coaxial mechanism 115 fulfills the adjustment of the coaxial degree via a rod end pushing bearing. The height regulating unit 116 is disposed at the lower part of the pulling rod body 112, namely at the lower part of the pulling rod body 112 below the scale table board 21. The height regulating unit 116 is able to conveniently adjust the demanded height of the pulling framework 11 according to the height of the scale table board 21 and the scale foundation 3 of the verification place.

Figure 5:
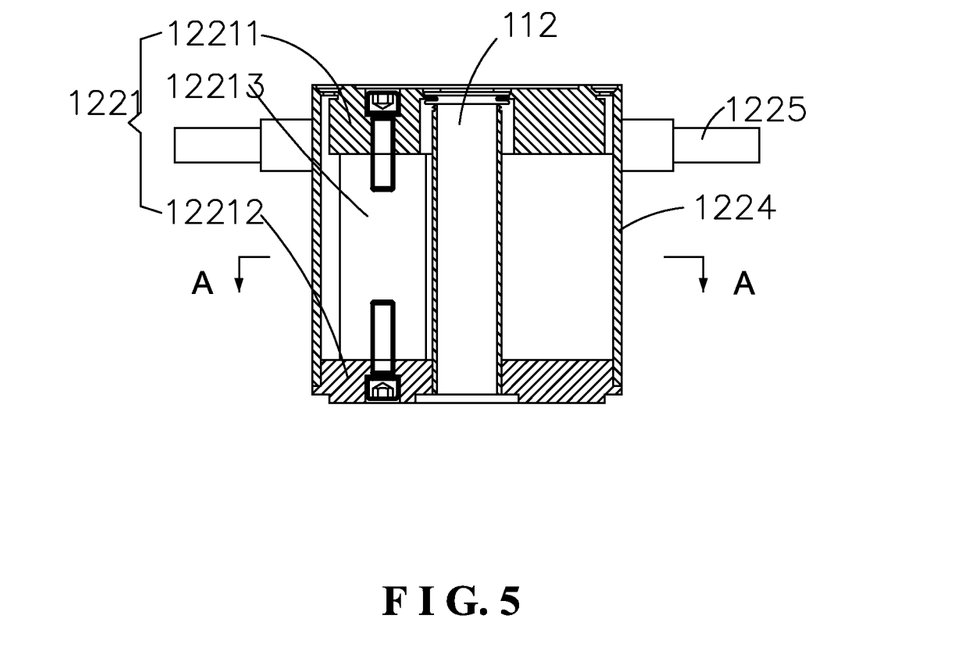
FIG. 5 is a cross-sectional view showing the standard cell of the present invention.

Referring to FIG. 5a and FIG. 5b, the high accuracy load gauge 122 includes at least three standard cells 1221. The standard cells 1221 are equidistantly disposed around a central axis of the pulling framework 11. The standard cell measure display gauge 1222 (see FIG. 3) and the standard cells 1221 are connected so that a resultant value of the force load of each standard cell 1221 is displayed. The standard cell 1221 includes an upper base 12211, a lower base 12212, and a spring unit 12213 disposed between the upper base and the lower base. The upper base 12211 adjoins a lower part of the pushing joint bearing 114 (see FIG. 4). The high accuracy load gauge 122 further includes a housing 1224 surrounding the standard cells 1221 and handles 1225 disposed on the housing 1224 for a convenient operation.

Figure 7:
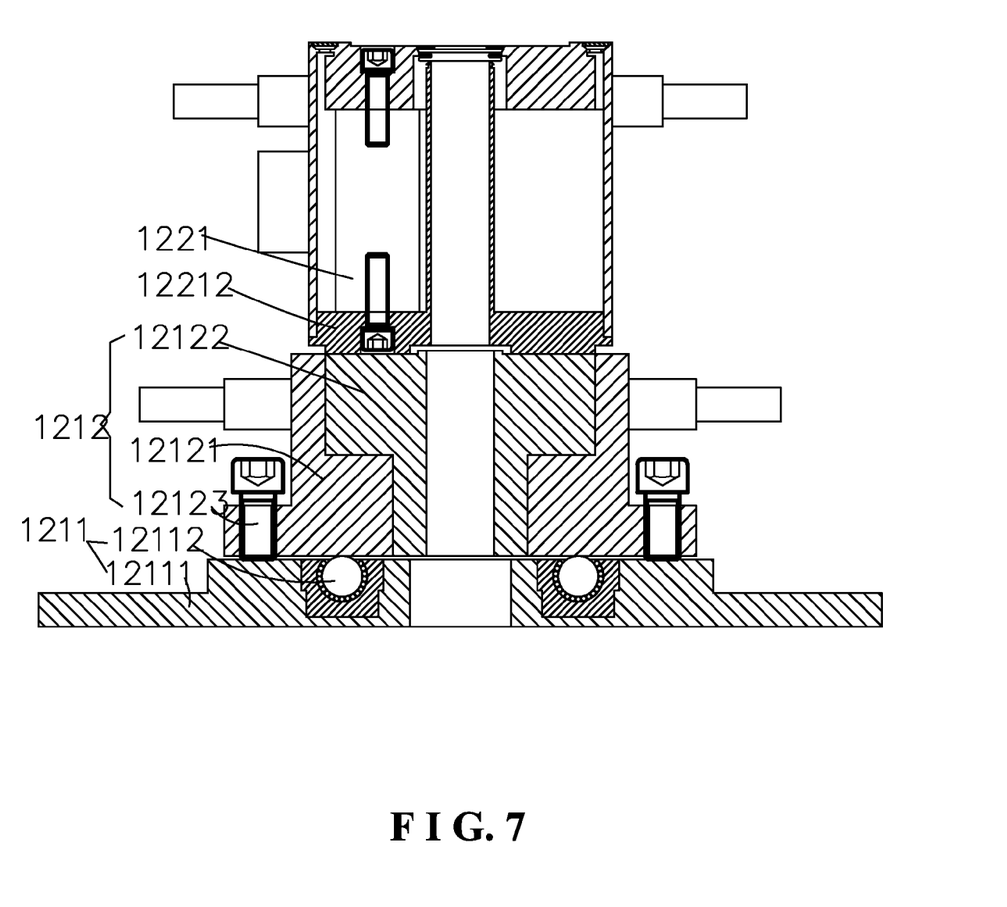
FIG. 7 is a cross-sectional view showing the location of the loading and unloading mechanism and the high accuracy load gauge.

Referring to FIG. 7, the loading and unloading mechanism 121 includes a self-locating pressure bearing plate 1211 and a main oil cylinder 1212. The main oil cylinder 1212 includes an oil cylinder portion 12121 disposed at an outside and a piston portion 12122 disposed at an inside. The piston portion 12122 is disposed to adjoin the lower base 12212 of the standard cell 1221. The piston portion 12122 operates by moving upward to render the standard cell 1221 subjected to a force. The loading and unloading mechanism 121 further includes a self-locating pressure bearing plate 1211 disposed on the scale table board 21 of the scale 2 (see FIG. 11) and sleevedly attached to the pulling framework 11. The self-locating pressure bearing plate 1211 is disposed below the main oil cylinder 1212. When the oil cylinder portion 12121 operates by moving downward to render the self-locating pressure bearing plate 1211 subjected to a force, which makes the scale table board subjected to the force as well. Because the self-locating pressure bearing plate 1211 contains a certain covering area, a partial zone in the vicinity of the scale table orifice 211 can be covered to simulate an effective weighing state of the scale 2 and fulfill a more scientific measurement and verification.

Figure 6:
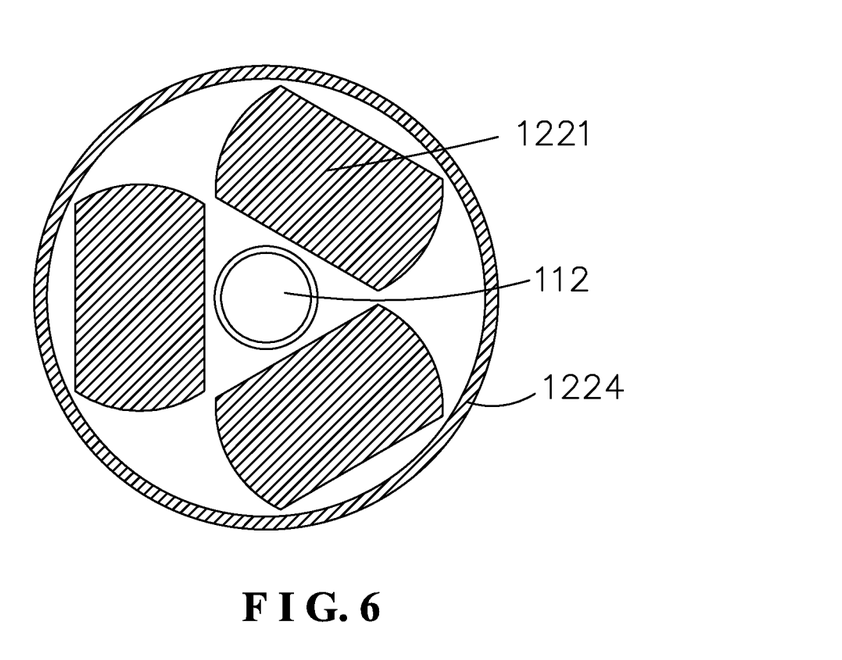
FIG. 6 is a cross-sectional view showing the A-A part of the standard cell in FIG. 5.
Figure 8:
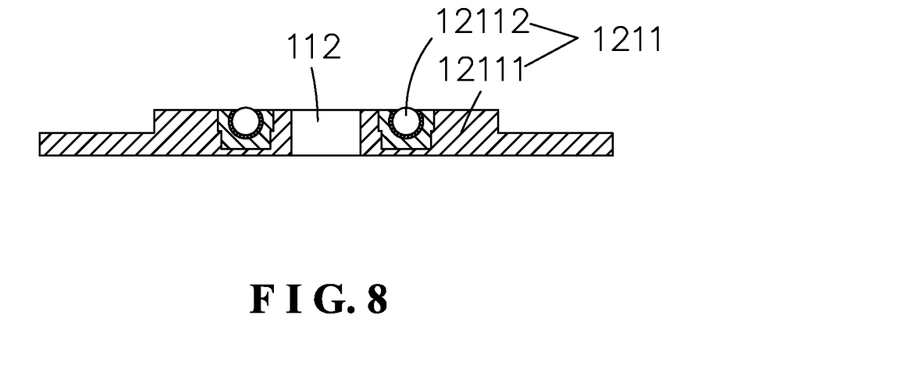
FIG. 8 is a cross-sectional view showing the self-locating pressure bearing plate of the present invention.
Figure 9:
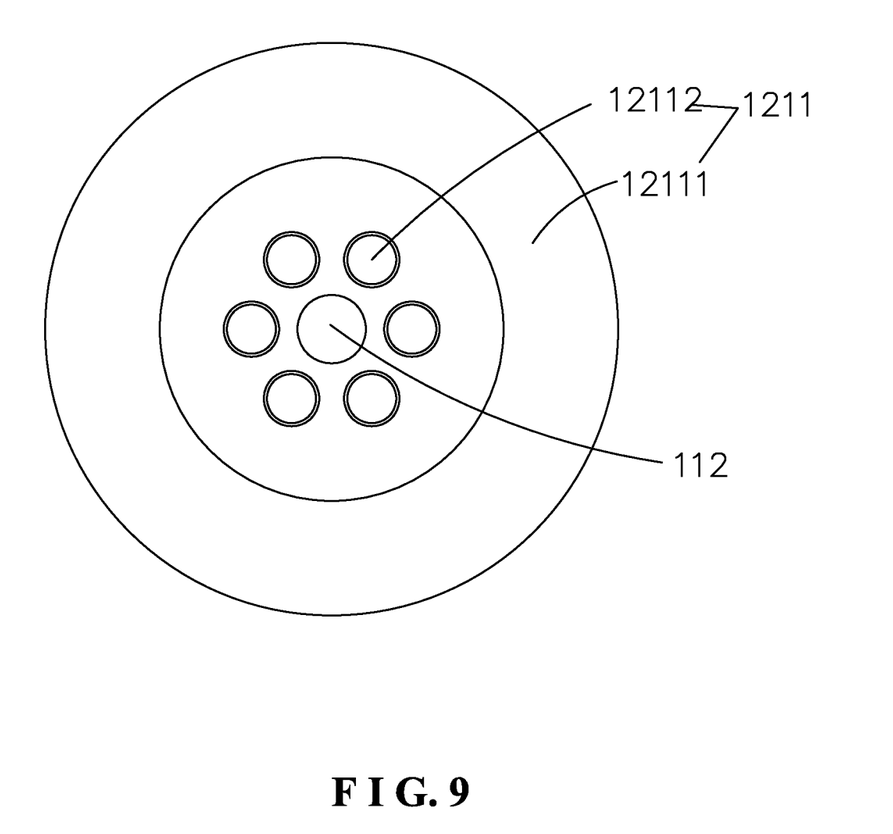
FIG. 9 is a top view showing the self-locating pressure bearing plate in FIG. 8.

Referring to FIG. 6, FIG. 8 and FIG. 9, the self-locating pressure bearing plate 1211 includes a pressure plate body 12111 and at least three universal ball bearings 12112. The pressure plate body 12111 and the oil cylinder portion 12121 are spaced apart. In this embodiment, six universal ball bearings 12112 are adopted. The universal ball bearings 12112 are equidistantly disposed around a central axis of the pulling rod body 112 and embedded into a top surface of the pressure plate body 12111. An upper portion of each universal ball bearing 12112 is exposed to contact the oil cylinder portion 12121 of the main oil cylinder 1211. Except the place at which each universal ball bearing 12112 contacts the oil cylinder portion 12121, interspaces are formed between the pressure plate body 12111 and the oil cylinder portion 12121 disposed above. The universal ball bearing 12112 is applied to automatically regulate a pressure bearing orientation so that a bearing axis of the standard cell 1221 is parallel to a bearing axis of the pulling rod body 112. At an outside of the main oil cylinder 1211, a fastener 12123 is disposed to execute a level adjustment. A top end of the fastener 12123 is propped against the top surface of the pressure plate body 12111 to adjust the main oil cylinder 1212 to attain a level state integrally, which facilitates a good use after the main oil cylinder 1212 is positioned.

Figure 2:
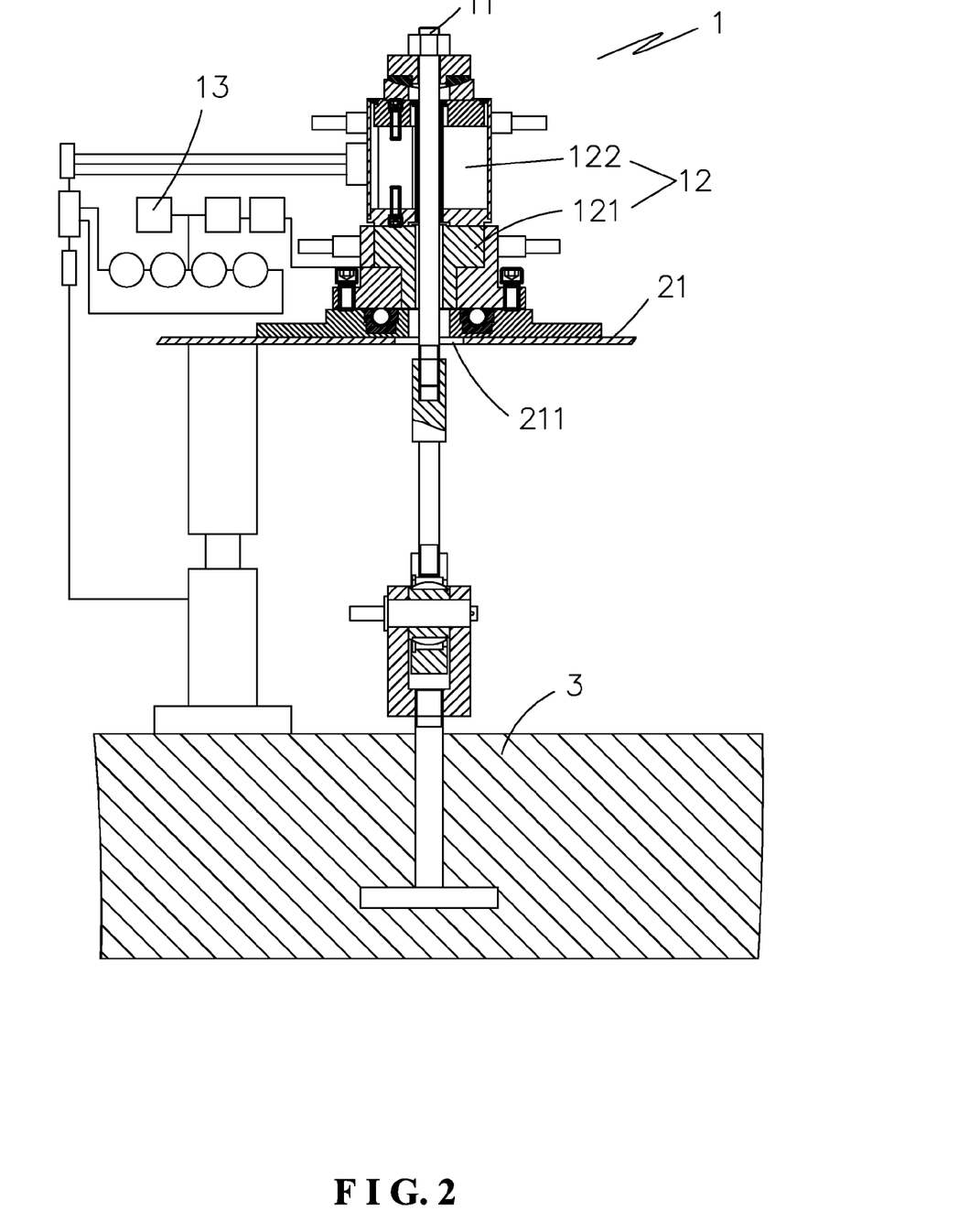
FIG. 2 is a cross-sectional view showing the verification system of the present invention.
Figure 10:
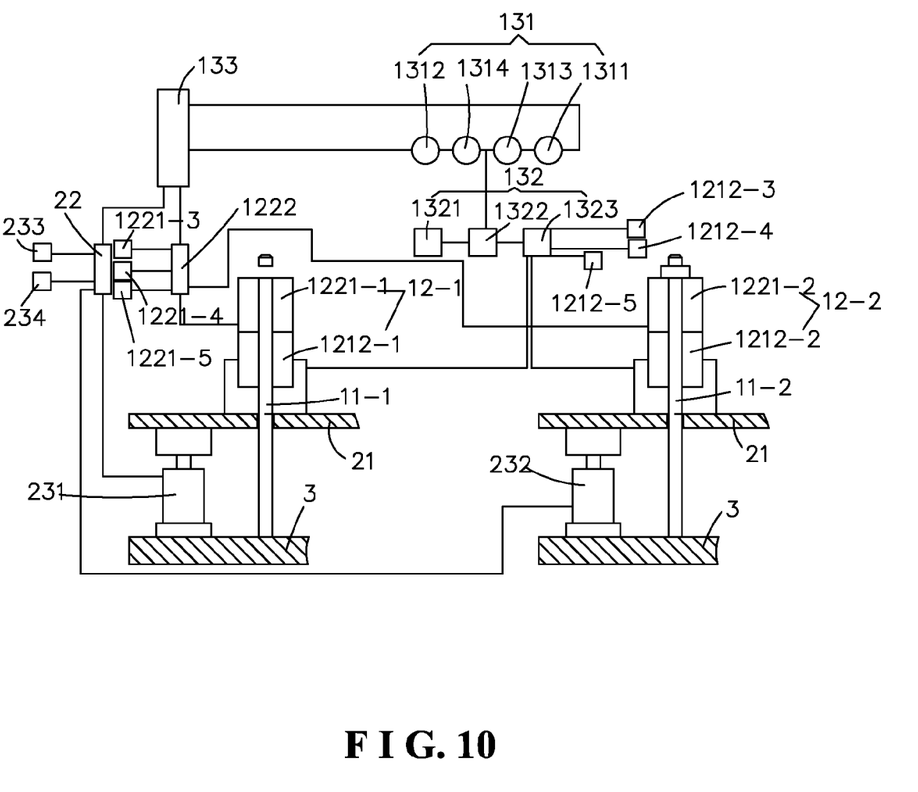
FIG. 10 is a schematic view showing the correlation of the interior and the exterior of the verification system of the present invention.

Referring to FIG. 2 and FIG. 10, the constant load control device 13 includes an oil source mechanism 131, a constant load control mechanism 132, and a computer with constant load control software 133. The oil source mechanism 131 includes a first serve electrical machine 1311, a second serve electrical machine 1312, a first serve oil pump 1313, and a second serve oil pump 1314. Input ends of the first serve electrical machine 1311 and the second serve electrical machine 1312 are connected to the computer 133. An output end of the first serve electrical machine 1311 is connected to an input end of the first serve oil pump 1313. An output end of the second serve electrical machine 1312 is connected to an input end of the second serve oil pump 1314. The constant load control mechanism 132 includes a flooding valve 1321, a reversing valve 1322, and an electric actuated stop valve 1323. The flooding valve 1321 regulates the flow amount or attains an overload protection. The reversing valve 1322 controls the oil feed or oil return of the main oil cylinder 1211. The electric actuated stop valve 1323 controls the operation of the main oil cylinder 1211. An input end of the reversing valve is connected to output ends of the first serve oil pump 1313 and the second serve oil pump 1314. The reversing valve is also connected to the flooding valve 1321. An output end of the reversing valve is connected to the electric actuated stop valve 1323 and then connected to the main oil cylinder 1211. Alternatively, the output end of the reversing valve is directly connected to the main oil cylinder 1211. The at least three standard cells 1221 and the standard cell measure display gauge 1222 are connected, and then the standard cell measure display gauge 1222 is connected to the computer 133. Each of the cells 231-234 of the scale is connected to a scale display gauge 22, and then the scale display gauge 22 of the scale is connected to the computer 133.

Referring to FIG. 2 to FIG. 10, the operation principle of elements adopted in the method for calibrating a large fixed electronic scale of the present invention is described as follows:

Pulling framework 11: The pulling framework 11 adjusts a coaxial degree of the pulling rod body 112 and the standard cell 1221 automatically via the self-adjustable coaxial mechanism 115 on the pulling rod body 112 so that the axes of the pulling rod body and the standard cell are parallel with each other, and the pulling framework keeps adjusting until the pulling rod body and the standard cell are perpendicular to the scale table board 21 of the verified scale 2. The pulling framework 11 adjusts a perpendicularity of the subjected force and a perpendicularity of the axis of the standard cell 1221 via the pushing joint bearing 114 on the pulling rod body 112 in order to make sure that a bearing axis of the standard cell 1221 corresponds to an axis of the standard cell 1221. The pulling framework 11 further includes the height regulating unit 116 which is able to conveniently adjust the demanded height of the pulling framework 11 according to the height of the scale table board 21 and the scale foundation 3 of the verification place. The pulling strength of the frame part can reach 300 kN.

Self-locating loading and unloading load measure device 12: Because the coaxial degree of the bearing force of the standard cell 1221 of the high accuracy load gauge 122 on the scale table board 21 cannot be assured when the large scale 2 is calibrated or verified, the self-locating pressure bearing plate 1211 is designed to automatically adjust a bearing axial direction of the standard cell 1221 to be parallel to a bearing axial direction of the pulling rod body 112 and the standard cell 112 allowing an eccentric load is also designed to meet the demand of the verification. The standard cell 1221 allowing the eccentric load comprises three standard cells 1221 with the property of collecting a resultant value evenly disposed between the upper base 12211 and the lower base 12212. These three standard cells have the same output sensitivity to output an electric signal in a positive proportion to the weight value and keep the resultant load unchanged when the standard cells 1221 bear the eccentric load. When the standard cell 1221 bears the force, the spring unit 12213 of the standard cell 1221 is deformed, which makes a strain gauge bridge on the spring unit 12213 lose the balance and outputs an electric signal in a positive proportion to a weight value. The signal is then amplified via a linear amplifier, then converted into a digital signal via an A/D, and thence processed by a microprocessor of the standard cell measure display gauge 1222 to display the weight value directly. The self-locating pressure bearing plate 1211 includes the pressure plate body 12111 and the universal ball bearing 12112. When the bearing axial direction of the standard cell 1221 of the high accuracy load gauge 122 is not parallel to the bearing axial direction of the pulling rod body 112 to reach the condition of FX>1 kgf, the universal ball bearing 12112 influences the loading and unloading mechanism 121 and the high accuracy load gauge 122, namely the loading and unloading mechanism 121 and the standard cell 1221 are able to adjust their locations automatically to make the bearing axial direction of the standard cell 1221 parallel to the bearing axial direction of the pulling rod. The piston portion 12122 adjoins the lower base of the standard cell 1221. When the piston portion 12122 operates by moving upward, the standard cell 1221 is subjected to the force due to the restriction of the limiting unit 1223. The self-locating pressure bearing plate 1211 is disposed below the main oil cylinder 1212. A counteracting force formed between the piston portion 12122 and the oil cylinder portion 12121 makes the oil cylinder portion 12121 move downward operatively, so the self-locating pressure bearing plate 1211 is subjected to the force and then the scale table board 21 is subjected to the force as well. In sum, the loading and unloading mechanism 121 starts loading the high accuracy load gauge 122 and the self-locating pressure bearing plate 1211 when the verification begins, and the high accuracy load gauge 122 and the self-locating pressure bearing plate 1211 are concurrently subjected to the load with the same force. The self-locating pressure bearing plate 1211 is put on the scale table board 21 of the scale 2, such as a truck scale, with the result that the scale table board 21 of the truck scale is subjected to a downward force load, amounting to a weight value of goods, which is thence displayed by the scale display gauge 22 of the truck scale. The high accuracy load gauge 122 applies a force standard machine (not shown) to be calibrated by fixed point, and an indicating value thereof is a true value. An error value of the scale 2 is a difference attained by comparing the displayed value of the high accuracy load gauge 122 and the displayed value of the scale display gauge 22 of the truck scale. As illustrated in FIG. 2, the self-locating loading and unloading load measure device 12 provides an accuracy of quality measurement that is superior to 0.01%, a repeatability that is superior to 0.01%, and an accuracy of self-alignment that is superior to $\phi 0.3$.

Constant load control device 13: The constant load control device 13 can reach the indexes, such as a sensitivity restriction at 0.01%, a load fluctuation (force source stability) at 0.005%/30 min, loading and unloading time per class less than 30 s (<30 s), and a force value stability retentive time superior to 1 hour.

Referring to FIG. 10, a truck scale 2 containing four cells 231-234 is taken as an example for describing the correlation of the verification system of the present invention. The scale includes a section of scale table board 21, a scale display gauge 22, and cells 231-234 connected to the scale display gauge 22. For an installation, scale table orifices 251-254 are disposed around the scale and a scale table orifice 255 is disposed at a centre of the scale table board 21. A pulling framework 11-1 and a self-locating loading and unloading load measure device 12-1 are disposed at the location of the scale table orifice 251. The self-locating loading and unloading load measure device 12-1 includes a standard cell 1221-1 and a main oil cylinder 1212-1. By the same token, a pulling framework 11-2 and a self-locating loading and unloading load measure device 12-2 are disposed at the location of the scale table orifice 252. The self-locating loading and unloading load measure devices disposed at other scale table orifices are herein omitted in FIG. 11. The self-locating loading and unloading load measure device 12-2 includes a standard cell 1221-2 and a main oil cylinder 1212-2. The standard cells 1221-1, 1221-2 are connected to the standard cell measure display gauge 1222. The standard cells 1221-3, 1221-4, 1221-5 are also connected to the standard cell measure display gauge 1222. The main oil cylinders 1212-1, 1212-2 are connected to the electric actuated stop valve 1323 of the constant load control device 13. Other main oil cylinders 1212-3, 1212-4, 1212-5 of the self-locating loading and unloading load measure devices disposed at other scale table orifice are also connected to the electric actuated stop valve 1323. The self-locating loading and unloading load measure devices share a standard cell measure display gauge 1222 so that standard values of weighing points are concurrently displayed.

The control principle of the system adopted by the verification method of the present invention is described as follows:

Referring to FIG. 10, the computer 133 controls the electric actuated stop valve 1323 to control a single or multiple self-locating loading and unloading load measure devices at the same time according to the demand for the verification of the truck scale, thereby fulfilling an auto-verification of a single weighing point or multiple weighing points of the truck scale. A controlling process for the self-locating loading and unloading load measure device 12-1 is herein taken as an example. It starts to test after setting and controlling a quality value. The electric actuated stop valve 1323 is opened to communicate an oil passage of the main oil cylinder 1212-1. Other oil passages are stopped. The computer 133 collects the effective signal of the standard cell 1221-1 via the standard cell measure display gauge 1222. Since the three standard cells are evenly disposed, the effective signal at this place is a resultant value of the three standard cells 1221, namely the resultant value is a real target quality value. After computing, the computer sends instructions regarding to the speed and rotation torque to the first serve electrical machine 1311 and the second serve electrical machine 1312. The first serve electrical machine 1311 controls the rotation speed and torque of the first serve oil pump 1313 and subjects the main oil cylinder 1212-1 to the oil feed via the reversing valve 1322. The second serve electrical machine 1312 controls the rotation speed and torque of the second serve oil pump 1314 and subjects the main oil cylinder 1212-1 to the oil return via the reversing valve 1322. The rotational speed difference of the first serve oil pump 1313 and the second serve oil pump 1314 decides the forward and backward movement, the pressure and the velocity of the main oil cylinder 1212-1. The main oil cylinder 1212-1 timely sends a signal to the computer 133 via the standard cell measure display gauge 1222 and the standard cell 1221-1. The computer 133 timely computes and sends instructions regarding to the speed and rotation torque to the first serve electrical machine 1311 and the second serve electrical machine 1312 so that a closed-loop control is formed. Until the resultant value of the standard cell 1221-1 reaches a predetermined quality value, the difference between the displayed value of the truck scale display, namely the scale display gauge 2210, and the displayed value of the standard cell measure gauge 1222 is an error of the scale control quality value. During the actual verification, the pulling framework 11 and the self-locating loading and unloading load measure device 12 are disposed about each of the scale supporting point. By using the constant load control device 13, the software of the computer 133, complying with the national standard "GB7723-2008 fixed electronic scale" and the regulation of verification "JJG539-1997 digital indicator scale verification", subjects the scale 2 to respective tests and detections in relation to the metrical property, such as a pre-pressurizing test, a weighing test, a discrimination test, a tare weighing test, an eccentric loading test, and a repeatability test. While executing every test and detection, the difference between the sum of the weighing value of each self-locating loading and unloading load measure device 12 and the displayed value of the scale display gauge 22 of the verified scale is a calibration error of the scale 2. The verification system 1 of the present invention allows the verification state of the truck scale to correspond with the weighing state of the vehicle to assure of the validity and the reliability of the verification conclusion of the electronic truck scale. In the embodiment, only the verification of the truck scale is described, but the present invention can not only adapted to the verification of the truck scale but to the verification of the large fixed electronic scale applied in various purposes and mechanisms.

Figure 11:
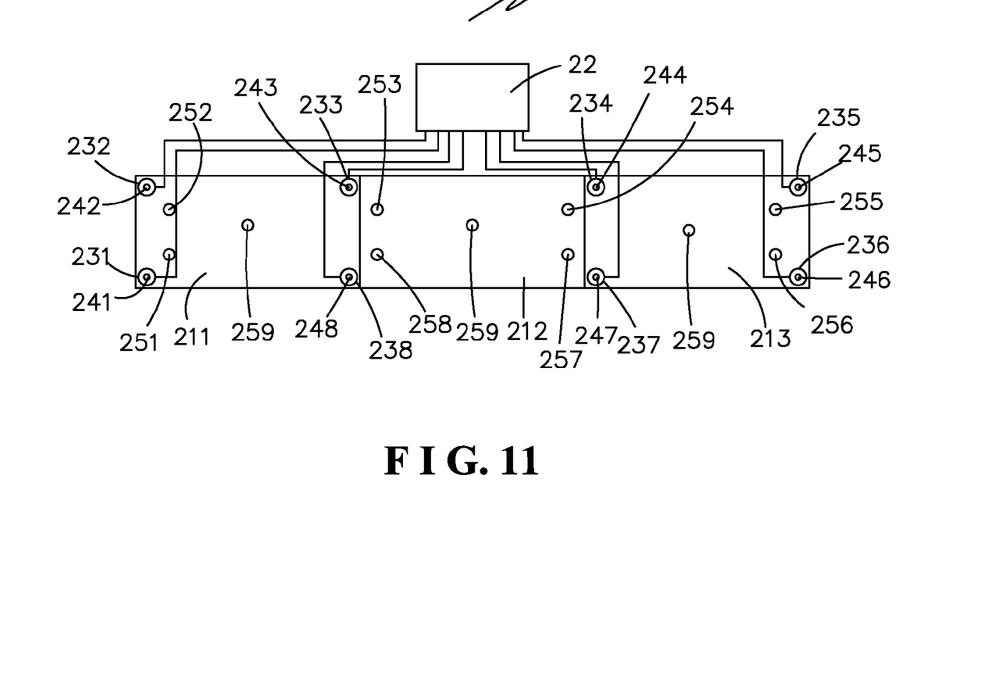
FIG. 11 is a schematic view showing the verification scale adopted by the verification system of the present invention.
Figure 12:
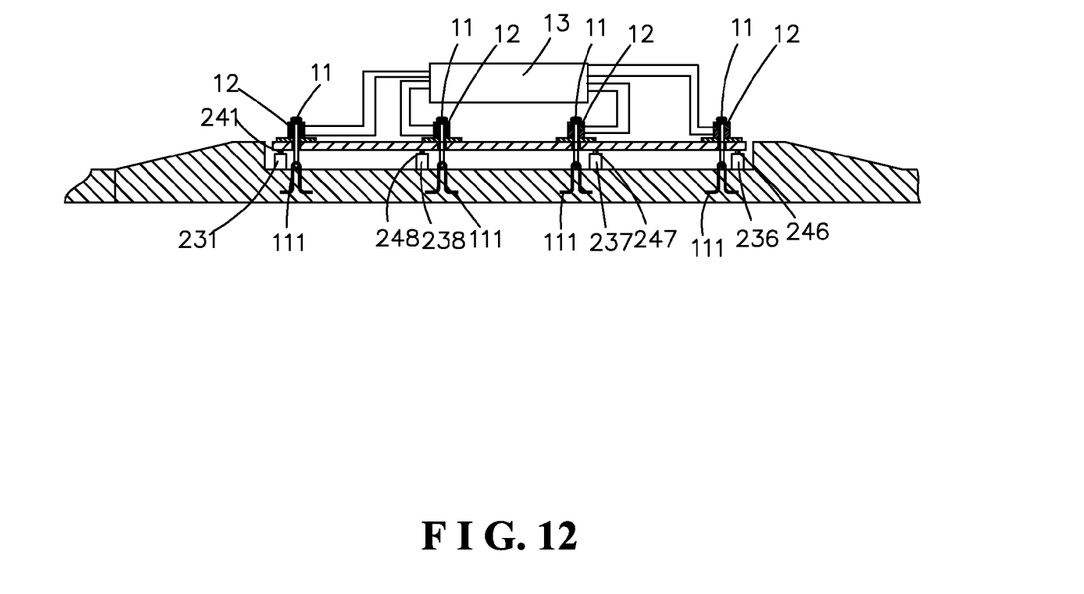
FIG. 12 is a further schematic view showing the verification scale adopted by the verification system of the present invention.

The method for calibrating a large fixed electronic scale of the present invention is described as follows:

Referring to FIG. 11 and FIG. 12, different from the conventional technique as disclosed in FIG. 1, the method of the present invention substitutes the second standard equipment as stipulated in the international standard for the standard weight or the standard weight and the substitute in order to go about verifying the scale 2. In FIG. 11, a fixed electronic scale 2, adopting a fixed electronic truck scale with a specification of 100 tons, includes a scale table board 21 and a scale display gauge 22. The scale table board 21 is divided into three sections 211, 212, 213. Eight cells 231-238 are used in the truck scale. Above the cells 231-238, eight cell supporting points 241-248 are disposed. For the verification, eight scale table orifices 251-258 are defined on the scale table boards and adjacent to the eight cell supporting points 241-248, and respective scale table orifices 259 are formed on centers of the three scale table boards 211-213. The scale table boards 21 of other scales also have multiple predetermined scale table orifices defined thereon. The standard equipments, namely the pulling framework and the self-locating loading and unloading load measure device 12, are well installed via the above orifices so that the verification is carried out under the control of a constant load control device. Referring to FIG. 12, the pulling frameworks 11 and the self-locating loading and unloading load measure devices 12 are concurrently installed on the eight scale table orifices 251-258 of the scale table board 21. Each pulling framework 11 is connected to a ground pulling collar 111, and there is still one constant load control device for controlling the operation of each self-locating loading and unloading load measure device 12.

Referring to FIG. 11 and FIG. 12 shows a verification procedure of the verification system of the present invention, including steps of:

1. Installing an independent auxiliary scale verification device without using a weight: install the pulling framework and the self-locating loading and unloading load measure device on the scale table orifice (groove) of the scale table board adjacent to each cell and the central board of each scale table board. By using the pulling rod (collar) below the connecting orifice (groove) of the pulling framework, the pulling framework and the self-locating loading and unloading load measure device are combined to function as a measure system for loading and unloading the scale table board.

2. Zero clearing: loosen the nut fastened onto the pulling framework so that the scale table is not loaded and the two measure gauges are cleared to zero.

3. Pre-pressurizing: adjust the nut fastened onto the pulling framework and load 200 kg to each self-locating loading and unloading load measure device. After stabilizing for 30 seconds, load each self-locating loading and unloading load measure device to the scale table by full span once. During the above stabilizing stage, the loading and unloading mechanism and the standard cell can adjust their locations automatically under the effect of the universal ball bearing, which renders the bearing axial direction of the standard cell able to be parallel to the bearing axial direction of the pulling rod.

The pulling framework automatically adjusts the coaxial degree of the pulling rod and the standard cell via the pushing joint bearing and rod end joint bearing on the pulling framework.

4. Accuracy of the zero setting and tare device and zero setting before loading: use ten weights each weighing 1 kg and ten weights each weighing 200 g to execute the accuracy of the zero setting and the tare device and carry out the verification of zero setting before loading.

5. Eccentric loading test: control the constant load control device to apply the load to the self-locating loading and unloading load measure devices in order of reference numerals to attain an eccentric loading value. Every time the load is applied to the eccentric loading value, maintain the load for 30 s, then record the displayed value of each self-locating loading and unloading load measure gauge and the gauge weighing display value of the scale, and thence make a comparison.

6. Weighing test: control the constant load control device to concurrently apply the load to the self-locating loading and unloading load measure devices by classes stipulated in the regulation except to the self-locating loading and unloading load measure device at the center of each scale table board. After applying the load, unload to the zero by classes in light of the counter load points. Every time the load is applied or unloaded to the load value, maintain the load for 30 s, then record the sum of the displayed value of each point on each self-locating loading and unloading load measure gauge and the gauge weighing display value of the scale, and thence make a comparison.

7. Tare weighing test: (1) first, apply a predetermined tare weight to the self-locating loading and unloading load measure device at the center of each table board of the scale table. After weighing the tare weight, control the constant load control device to concurrently apply the load to the self-locating loading and unloading load measure devices by classes stipulated in the regulation. The load applied to the self-locating loading and unloading load measure device at the center of each scale table board is unchanged. After applying the load, unload to the zero by classes in light of the counter load points. Every time the load is applied or unloaded to the load value, maintain the load for 30 s, then record the sum of the displayed value of each point on each self-locating loading and unloading load measure gauge and the gauge weighing display value of the scale, and thence make a comparison; and (2) apply a different predetermined tare weight again to the self-locating loading and unloading load measure device at the center of each table board of the scale table. After weighing the tare weight, repeat the above steps and then record the sum of the displayed value of each point on each self-locating loading and unloading load measure gauge and the gauge weighing display value of the scale for comparing.

8. Repeatability test: control the constant load control device to concurrently apply the load to self-locating loading and unloading load measure devices by classes stipulated in the regulation except to the self-locating loading and unloading load measure device at the center of each scale table board. After applying the load, unload to the zero. Every time the load is applied to the load value, maintain the load for 30 s, then record the sum of the displayed value of each point on each self-locating loading and unloading load measure gauge every time and the gauge weighing display value of the scale for making a comparison, and thence repeat the above steps more than three times.

9. Determine whether the weighing accuracy of the truck scale needs to be adjusted according to the verification result. If the adjustment is needed, repeat the above steps until the truck scale complies with the regulation of verification.

In the embodiment, only the verification of the truck scale is described, but the present invention can not only adapted to the verification of the truck scale but to the verification of the large fixed electronic scale applied in various purposes and mechanisms.

While the present invention can have other preferred embodiments, it is understood that fabrication and use to make further variations, alternatives and modifications, may be made without departing from the scope of the present invention.

What is claimed is:

1. A method for calibrating a large fixed electronic scale, said method being a verification method which applies an auxiliary verification device to calibrate said large fixed electronic scale without using a weight, characterized in that said verification method includes steps of:

step 1: loading and unloading every supporting point on a scale table board of said scale by at least four self-locating loading and unloading mechanisms;

step 2: applying at least four high accuracy load gauges to measure and display a load that each of said loading and unloading mechanisms applies to said scale table board;

step 3: applying a constant load control device to control a size of said load that each of said loading and unloading mechanisms applies to said scale table board and further control a size of a load of each supporting point on said scale table board so that said load of each supporting point corresponds to a required load applied to each of said supporting points while calibrating said scale; and step 4: comparing a precise load displayed by said high accuracy load gauges with a gauge weighing display value of said scale to obtain a calibration error of said scale wherein in said step 2, said high accuracy load gauges are respectively disposed above said loading and unloading mechanisms so that said high accuracy load gauges and said scale table board are concurrently subjected to a load with a same force and said load is displayed when said scale table board is loaded by said loading and unloading mechanisms, an accuracy of said high accuracy load gauges is at least three times larger than an accuracy of said scale required to be verified.

2. The method as claimed in claim 1, wherein said step 1 includes steps of:

s1: forming through orifices on said scale table board vicinity to said supporting points of said scale respectively and correspondingly disposing a ground pulling collar or pulling rod into a scale table foundation below each of said through orifice in advance;

s2: installing a pulling framework at each of said through orifices to be perpendicular to said scale table board, and penetrating said pulling framework through said through orifice in step s1 for fixing said pulling framework with said ground pulling collar or pulling rod; and s3: arranging said loading and unloading mechanism around each pulling framework above said scale table board, which load and unload said scale table board by self-locating.

3. The method as claimed in claim 2, wherein said high accuracy load gauge includes at least three standard cells equidistantly disposed around said pulling framework so that said at least three standard cells are applied to detect a resultant value of said load which said loading and unloading mechanism applies to load said scale table board, each standard cell is connected to a standard cell measure display device, said standard cell measure display device shows a size of said load, a detachable and adjustable limiting unit is disposed above each of said standard cells to assure that said high accuracy load gauges and said scale table board are concurrently subjected to a load with a same force when said scale table board is loaded by said loading and unloading mechanisms.

4. The method as claimed in claim 3, wherein in step s, said loading and unloading mechanism applies a pressure bearing plate with an embedding of a universal bearing disposed between said scale table board and said loading and unloading mechanism to automatically regulate a pressure bearing orientation so that a bearing axis of said standard cell is parallel to a bearing axis of said pulling framework.

5. The method as claimed in claim 3, wherein in step s3, said loading and unloading mechanism is adopted by an oil cylinder system, said oil cylinder system includes an oil cylinder portion and a piston portion, said piston portion operates by moving upward to render said standard cell subjected to a force and said oil cylinder portion operates by moving downward to render said scale table board subjected to a force.

6. The method as claimed in claim 3, wherein a pushing joint bearing is disposed on a top of said pulling framework to assure that a bearing axis of said standard cell corresponds to an axis of said standard cell, said pulling framework disposes a rod end joint bearing at a place below said scale table board to automatically adjust a coaxial degree of said pulling framework and said standard cell, render both axes of said pulling framework and said standard cell parallel with each other, and adjust said pulling framework and said standard cell to be perpendicular to said scale table board required to be verified, said pulling framework further applies a height regulating unit to adjust a demanded height of said pulling framework.

7. The method as claimed in claim 3, wherein said high accuracy load gauge applies a force standard machine to be calibrated by fixed points, and an indicating value thereof is a true value.

8. The method as claimed in claim 3, wherein said through orifice is a circular orifice with a diameter of $\phi60$ mm or a quadrangular orifice with a specification of 50 mm×50 mm.

9. The method as claimed in claim 2, wherein said high accuracy load gauge applies a force standard machine to be calibrated by fixed points, and an indicating value thereof is a true value.

10. The method as claimed in claim 2, wherein said through orifice is a circular orifice with a diameter of $\phi60$ mm or a quadrangular orifice with a specification of 50 mm ×50 mm.

* * * * *